(12) United States Patent
Feldmann et al.

(10) Patent No.: US 8,997,552 B2
(45) Date of Patent: Apr. 7, 2015

(54) METHOD FOR LEAK-TESTING HAND-HELD PISTON STROKE PIPETTES AND ASSOCIATED LEAK-TESTING APPARATUS

(75) Inventors: Rainer Feldmann, Rimpar (DE); Wolfgang Ettig, Külsheim (DE)

(73) Assignee: Brand GmbH + Co KG, Wertheim (DE)

( * ) Notice: Subject to any disclaimer, the term of this patent is extended or adjusted under 35 U.S.C. 154(b) by 326 days.

(21) Appl. No.: 13/505,076

(22) PCT Filed: Oct. 20, 2010

(86) PCT No.: PCT/EP2010/006406
§ 371 (c)(1),
(2), (4) Date: Jun. 18, 2012

(87) PCT Pub. No.: WO2011/050917
PCT Pub. Date: May 5, 2011

(65) Prior Publication Data
US 2012/0240663 A1    Sep. 27, 2012

(30) Foreign Application Priority Data
Oct. 28, 2009 (EP) .................................. 09013570

(51) Int. Cl.
- G01M 3/28 (2006.01)
- G01M 3/26 (2006.01)
- B01L 3/02 (2006.01)

(52) U.S. Cl.
CPC .............. *G01M 3/26* (2013.01); *B01L 3/0217* (2013.01); *B01L 2200/146* (2013.01); *B01L 2300/025* (2013.01)

(58) Field of Classification Search
USPC ...................... 73/40, 40.5 R, 49.1–49.3, 49.5
See application file for complete search history.

(56) References Cited

U.S. PATENT DOCUMENTS

| | | | |
|---|---|---|---|
| 4,109,513 A * | 8/1978 | Schott | 73/49.1 |
| 5,537,880 A * | 7/1996 | Takeda et al. | 73/864.25 |
| 6,370,942 B1 * | 4/2002 | Dunfee et al. | 73/37 |
| 6,627,160 B2 | 9/2003 | Wanner | |
| 6,743,205 B2 * | 6/2004 | Nolan et al. | 604/154 |
| 6,826,957 B2 * | 12/2004 | Martone et al. | 73/40.5 R |
| 7,926,325 B2 * | 4/2011 | Kaplit | 73/37 |
| 8,307,722 B2 * | 11/2012 | Tajima et al. | 73/864.11 |

(Continued)

FOREIGN PATENT DOCUMENTS

| | | |
|---|---|---|
| DE | 82 30 186 U1 | 4/1983 |
| DE | 39 03 241 A1 | 8/1990 |
| DE | 693 26 773 T2 | 3/2000 |

(Continued)

*Primary Examiner* — Randy W Gibson
*Assistant Examiner* — Natalie Huls
(74) *Attorney, Agent, or Firm* — Studebaker & Brackett PC

(57) ABSTRACT

A method for leak testing of hand-held piston stroke pipettes and a corresponding leak testing apparatus (1) for performing the method. Essential to the system is a holder (8) for the sealed connection of a pipette tip (3) to the leak-testing apparatus. A line system (9) with connecting sections of the leak-testing apparatus forms a specific connection volume. The pipette tip (3) is evacuated to a measuring pressure below atmospheric pressure. With the vacuum pump (5) disconnected and the connection volume sealed off, the pressure is measured after a specific time interval, and any possible rise in pressure is determined. An indication of the serviceability of the pipette (2) is generated from the pressure rise determined.

27 Claims, 1 Drawing Sheet

(56) References Cited

U.S. PATENT DOCUMENTS

2004/0139789 A1* 7/2004 Masters .................. 73/49.2
2012/0210772 A1* 8/2012 Izumo et al. .................. 73/40

FOREIGN PATENT DOCUMENTS

| | | |
|---|---|---|
| DE | 199 11 397 A1 | 10/2000 |
| EP | 1 785 731 A1 | 5/2007 |

* cited by examiner

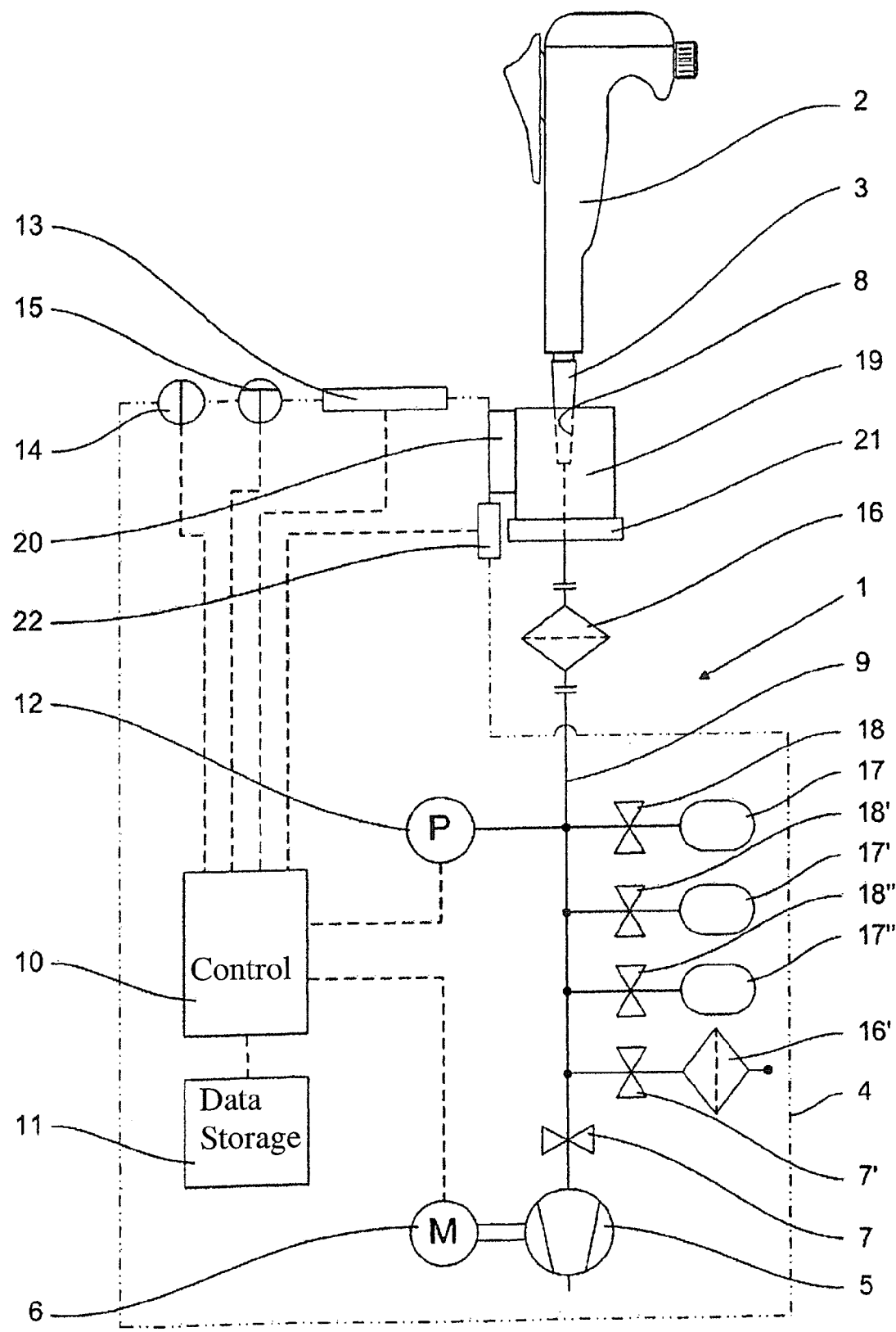

METHOD FOR LEAK-TESTING HAND-HELD PISTON STROKE PIPETTES AND ASSOCIATED LEAK-TESTING APPARATUS

BACKGROUND OF THE INVENTION

1. Field of the Invention

The invention relates to a method of leak testing of handheld, single-channel or multichannel piston stroke pipettes, preferably of those with air cushions. The subject matter of the invention is also a leak testing apparatus which is suitable for carrying out this method. The subject matter of the invention is finally a system which includes the corresponding leak testing apparatus.

2. Description of Related Art

Piston stroke pipettes are likewise known as hand-held single channel measurement devices (German Patent Application DE 39 03 241 A1) as well as multichannel measurement devices (German Patent Application DE 100 13 511 A1 and corresponding U.S. Pat. No. 6,627,160 B2). In the process of aspiration of a sample liquid, negative pressure is produced in the piston stroke pipette and in the pipette tip which is slipped onto a slip-on section of the pipette. Sample liquid is sucked into the pipette tip by this negative pressure. Piston stroke pipettes, as direct displacers, have no air volume or only a minimum air volume above the liquid level in the pipette tip. They are less suited for biological samples since, there, it is necessary to work largely free of contamination. Therefore, air cushion piston stroke pipettes are more common in which there is a distance between the bottom of the piston and the liquid level such that the liquid level is always only in the interchangeable pipette tip which is generally made as a disposable part, while the piston bottom moves distinctly above the liquid level and thus is protected against contamination.

In piston stroke pipettes and especially in air cushion piston stroke pipettes, the requirement of tightness of all connecting sites of the pipette and the pipette tip is very strict. Due to the differential pressure during suction, air can unintentionally flow into the dead space above the liquid level via a leak. The volume which has been enlarged by the piston stroke then no longer agrees with the actually changed volume.

The sealing sites of piston stroke pipettes are subject to wear during operation. Ageing, chemical attack and other ambient influences have adverse effects, even for static seals. One especially sensitive sealing site, in addition to the dynamic piston seal, is the connection between the pipette tip and pipette on the slip-on section. For hand-held piston stroke pipettes, the process of slipping on the pipette tip takes place manually and essentially free-handed. The surfaces of the slip-on section and pipette tip are highly stressed in doing so. Moreover, new pipette tips are always being used (disposal part) so that the production tolerances of the pipette tips and the surface quality of the sealing surfaces of the pipette tips become noticeable. As a result, after longer use ridges form on the slip-on section of the pipette which can ultimately lead to a leak. Therefore, a slowly rising leakiness is characteristic for piston stroke pipettes.

Not every leak leads to a loss of serviceability of a piston stroke pipette. A very small leak can be tolerated. If the leak has only a very small flow cross section, air flows only very slowly into the dead volume of the pipette and the leak can still be within the framework of the acceptable fault tolerance.

For piston stroke pipettes, it is thus part of normal laboratory operation that the pipettes are subjected to leak testing from time to time. This is regardless of whether they are hand-held piston stroke pipettes or automatic pipetting devices. Even in the latter, there is still a corresponding risk of leaks, all the more considering that observation is limited or not possible at all.

For automatic pipetting devices, in the past, only an optical leak test was performed and such testing was only able to identify coarse leaks. According to this traditional method, the operation of the automatic pipetting device is temporarily stopped after the pipette tip into which the sample liquid has been sucked has been moved upward from the liquid level. An operator visually checks whether sample liquid is dripping from the pipette tip. For this method, a highly experienced operator is required. Moreover, this method can only be used for large leaks and large amounts of liquid. For small volumes of sample liquid, for example, of 10 µl, this method fails.

Therefore, for an automatic pipetting device, an automated method for leak testing has already been proposed (German Patent DE 693 26 773 T2) in which the pressure which is prevailing in the pipetting device, therefore in the dead volume of the pipette and pipette tip, is measured and evaluated in different pipetting states. For this purpose, the pipetting device is itself provided with a pressure sensor which detects the pressure in the dead volume between the liquid level and the piston bottom of the piston pump of the pipette. An electronic control apparatus compares the internal pressure which has been detected by the pressure sensor after taking in of the sample liquid relative to the atmospheric pressure of the ambient atmosphere. In this way, a major leak can be ascertained which makes aspiration of the sample liquid more or less completely impossible. In a second step, the internal pressure with the piston pump stopped after a certain time interval is measured and compared to the internal pressure which prevailed immediately after the end of aspiration. Depending on the pressure rise which has been determined in this method, a leak warning for the automatic pipetting device is delivered or the automatic pipetting device is released for further precision pipetting.

In the above explained known method for leak testing, in an automatic pipetting device, typical volumes of the sample liquid taken in during the leak test are 200 to 500 µl distilled water. The time interval during which pressure in the dead volume of the pipette is measured is typically 30 s compared to the first measurement immediately after stopping the pump after roughly 500 ms. This patent does not disclose anything about pressure conditions.

A method for leak testing in automatic pipetting devices cannot be applied to hand-held piston stroke pipettes, preferably air cushion piston stroke pipettes. To do this, the pipette itself would have to be equipped with a corresponding leak testing apparatus. This cannot be justified in terms of costs and would not be commercially acceptable. For this reason, manual methods for leak testing which can be carried out externally are used for hand-held piston stroke pipettes.

In a known method (Eppendorf, Pipettentester 4708), a bottle which stores a liquid, a filled hose connected to it, and an adapter are used. The adapter is connected to the attached pipette tip. The pipette arranged with the pipette tip up. The liquid level which is settling is marked. After several actuations of the piston of the pipette the position of the liquid level is checked again, the pipette having to be held exactly at the same height. If the liquid level has been established at a lower level, the system of pipette and pipette tip is leaky.

Another similar method is also known in which a hose which leads to a leak testing apparatus is connected to the pipette tip which has been slipped onto the pipette. The leak testing apparatus has a hand-actuated piston pump which produces a negative pressure and an analogously operating manometer which is connected to the piston pump on the intake side as a pressure sensor. The vacuum pump is actuated by hand until a sufficient measurement pressure below atmospheric pressure is established which is shown on the manometer. In this position, it is attempted to fix the vacuum pump by hand so that its pump volume no longer changes. Then, the pipette is repeatedly actuated with the other hand. If afterwards the manometer shows a higher pressure than previously, a leak in the system of pipette and pipette tip must be concluded to exist.

The method for leak testing of hand-held, single-channel or multichannel piston stroke pipettes, preferably of those with air cushions, which is carried out with the above explained device constitutes the point of departure for the teaching of this application.

In addition to the above explained known method, a method is known which works with a special measurement pipette (German Utility Model DE 82 30 186 U1). Here, a measurement pipette is connected to the pipette via an adapter. The sample liquid is taken up directly by the measurement pipette. The taken-up volume can be read directly on its scale. This volume can be compared to the setpoint which has been set on the pipette. In this method, it is disadvantageous that the air cushion, therefore the dead volume, does not agree with the air cushion which is actually present in the pipette in normal operation. The hydrostatic pressure of the taken-up liquid is also greater. Consequently, the method with use of the measurement pipette does not correspond to the actual method in working with the pipette itself.

Studies have shown that different parameters arise in pipetting with different pipettes and pipette tips which influence the results of leak testing in wide limits. The operator must ascertain by experience which parameters must be maintained and to what extent. Such a parameter is the minimum negative pressure below atmospheric pressure which forms in the intake process (see the explanation of German Patent Application DE 39 03 241 A1 above). The viscosity of the sample liquid, the strength of the reset spring which acts on the piston of the piston pump and the flow cross section of the pipette tip influence the negative pressure which is being established. The pipette should be tested at least with this pressure in order to correctly detect the amount of gas flowing in at the leak and in a manner suitable for practice. Another parameter is the pressure rise over a certain time interval. It is dependent on the size of the dead volume in the unit consisting of the pipette and pipette tip during the leak test. Even the initially explained method for leak testing in an automatic pipetting device does not take this quantity into account. Consequently a lowermost boundary value must be stipulated itself for the sake of reliability. The result is that pipettes which are in fact still usable are also serviced.

SUMMARY OF THE INVENTION

The present invention is directed to the problem of devising a method for leak testing of hand-held piston stroke pipettes which allows a reliable leak testing of these piston stroke pipettes which is more independent of the qualifications of the operator. A further object is to devise a corresponding leak testing apparatus for hand-held piston stroke pipettes which can be coupled the pipettes and to the system in this respect.

The above explained problem is solved by a leak testing method and apparatus as described below.

The method according to the invention can proceed outside of the hand-held piston stroke pipette based on a separate leak testing apparatus to which the piston stroke pipette with the pipette tip attached is connected. The pipette and a connection volume in the test device are evacuated to a measurement pressure below atmospheric pressure. With the vacuum pump stopped or disconnected after a certain time interval, a possible pressure rise in the connection volume is measured by means of a pressure sensor. The method can be carried out in two different ways.

In one case, after determining the pressure rise by means of the display apparatus, the pipette is evaluated immediately as sufficiently tight/usable or not sufficiently tight/unusable. This method for the operator requires knowledge of the reliable pressure rise of the tested piston stroke pipette with the pipette tip slipped on and/or a digital display.

The other version of the method also automates the adjustment process in that, with the vacuum pump stopped or disconnected and the connection volume sealed, the pressure in the connection volume during a certain time interval and/or after a certain time interval is measured by a sensor and a possible pressure rise is determined preferably by means of an electronic control apparatus and compared by means of an electronic control apparatus with a reference value stored in its data storage, or for a continuous characteristic with stored reference values. These values then apply to the pipette which is to be tested at the time, to a pipette group and/or to certain pipette tips of certain volumes or a certain volume group. Depending on the result of this comparison, the pipette is then, optionally also automatically, evaluated as sufficiently tight/usable or not sufficiently tight/unusable.

With the method according to the invention there is reliable and prompt checking of the serviceability of pipettes. An incipient leak of a pipette can be recorded. The operator can provide for replacement and/or repair in time. A failure probability for pipettes of a certain pipette type can also be statistically determined over test intervals. In the simplest case, the control takes place manually and the pressure sensor is directly coupled to the display apparatus which digitally displays the function states of the tested piston stroke pipette. But, instead, an electronic control apparatus is used which takes over evaluation.

With respect to the pressure rise which is to be measured in the connection volume of the leak testing apparatus, it is recommended that, based on the pressure rise determined as indicated above, the pipette is evaluated as sufficiently tight/usable or not sufficiently tight/unusable by means of the display apparatus, a pressure rise from roughly 0.1 hPa to roughly 50 hPa being evaluated as allowable. The pressure rise is dependent on the error limit of the pipettes and on their dead volume and the connection volume. Therefore, there is no proportional relationship with respect to the rated volume of the pipettes. The allowable pressure rise can be computed from these parameters and its boundary value can be ascertained therefrom.

It is recommended that the evaluation by means of a display apparatus of the leak testing apparatus takes place only digitally. In particular, it is feasible in terms of evaluation technology that display takes place by means of the display apparatus optically, especially with different symbols, colors and/or illuminants. In the course of multistage display, for example, it can be provided that the stage "green" is assigned to pressure increases up to a certain percentage of the boundary values, the region "yellow" to following pressure rises up to the boundary value which do not allow the error limit to be exceeded and pressure rises above that are assigned to the region "red".

Alternatively or in addition, it can also be provided that the display takes place by means of the display apparatus acoustically, especially with tones of different frequency. An acoustic display has the advantage that it is perceived without further assistance of the operator.

Various parameters are of interest for executing the method according to the invention for leak testing. For a practical test, it has been shown that it is feasible if a measurement pressure from roughly 20 hPa to roughly 300 hPa below atmospheric pressure is used. For a static and mainly for a dynamic test, i.e., repeated actuation of the piston stroke pipette at the applied measurement pressure, the measurement pressure should be chosen such that the spring force against the manual piston movement is not exceeded, i.e., the piston motion is still possible during aspiration.

With respect to the time interval for determining the pressure increase, it is recommended that a time interval from roughly 3 s to roughly 60 s, especially from roughly 5 s to 20 s, be used.

It cannot be avoided that the leak testing apparatus has an additional gas volume, the connection volume which must be considered in the measurement of the pressure rise in order to correctly evaluate the measurement results.

The entire range would not be possible to cover with a connection volume of average size which has been unchanged in this respect because under certain circumstances the measurement accuracy of the pressure sensor would not suffice. For a wider range, different connection volumes which can perhaps be made available over different measurement channels could be imagined.

It has been shown that this connection volume should advantageously lie within a certain size range for typical piston stroke-air cushion pipettes in order to be able to dynamically test the pipettes. Here, the piston of the pipette is moved and an amount of air, which can be considerable depending on the size of the piston stroke pipettes, is supplied to the connection volume of the leak testing apparatus and removed again. The connection volume of the leak testing apparatus must be dimensioned such that a pressure increase above atmospheric pressure does not occur during supply. Likewise, the inflowing gas volume through a leak of a certain size, the expected test time and the number of actuations are also included. It should also be watched that, by supplying or removing air during the dynamic testing, an in part considerable change of the measurement pressure occurs which influences the criterion for the pressure rise in the connection volume. It has been shown that, for pipettes and pipette tips between 10 µl and 10 ml, advantageously, a leak testing apparatus is used whose connection volume is between roughly 1.0 ml and roughly 200 ml. The connection volume is increased for this purpose by an additional volume. The additional volume is connected via a valve, especially during evaluation. It is also possible to connect several additional volumes or those of different size in order to match the connection volume to the dead volume of the pipette/pipette tip system which is to be tested. Air cushion piston stroke pipettes down to 1 µl are in use, the upper volume limit for conventional piston stroke pipettes is currently 10 ml. Altogether, it is such that the connection volume numerically indicated here is added to the dead volume of the pipette and pipette tip.

The total volume is evacuated during testing and at least the connection volume and the dead volume of the pipette/pipette tip are vented again to atmospheric pressure. It is advantageous if the additional volume of the leak testing apparatus, after first-time evacuation, is no longer vented in order to save this time. In order to stabilize the measurement pressure in the lines and components, a considerable additional time interval is surprisingly required. Rapid evacuation and venting cause an adiabatic temperature difference between the gas volume and the line system which leads to a drift in the measurement pressure and can only be compensated prior to stopping or disconnecting of the vacuum pump in the test process by a further time interval. When the already evacuated additional volumes are connected, this time requirement decreases toward zero.

Surprisingly, this time requirement could be reduced at least in the first-time evacuation also by a mass which stabilizes the temperature of the gas volume, located in the connection volume and/or additional volume. The test time is greatly reduced when the mass has a surface/volume ratio greater than 3, and by orders of magnitude when the ratio is greater than 20. The mass can be made not only as an additional component, but can also be achieved by a special, uniform shaping of the inner walls.

In order to be able to make provisions for different pipette tips, it can be recommended that, in connecting a pipette tip, an adapter is used which is matched to the pipette tip in use at the time. In particular, it is recommended that adapters for different pipette tips have the same connection volume. This applies accordingly also to multichannel piston stroke pipettes. Adapters with the corresponding number or a fraction of the number of holders for the pipette tips are used. For multichannel piston stroke pipettes whose channels are to be subjected to an individual test, the individual and each channel for itself can be tested. In order to shorten this process, a leak testing apparatus with an adapter is advantageously used which has connection volumes which can be connected individually via valves with or without correspondingly connected pressure sensors. The use of different adapters for different pipette tips is obligatory. Coding of the adapters and automatic detection by the leak testing apparatus has proven advantageous in avoiding errors.

It has already been pointed out above that the dead volumes of different pipettes and pipette tips for different volumes to be pipetted, shapes and constructions of the pipette tips and pipettes can vary. This has a major effect on the measurement results of the leak test. Therefore, it is recommended that, before the actual leak test in the method according to the invention for leak testing, a determination of the type of pipette and/or the pipette tip be undertaken prior to the pipette tip being slipped onto the pipette. On the leak testing apparatus, an adjustment to these components can be undertaken for this purpose. This input can take place manually, but it is advantageous if coding on the pipette and/or pipette tip is detected with a reader on the leak testing apparatus. The control apparatus can then compare the coding to the codings stored in the data storage and determine the corresponding adjustment. Preferably, the values of different known pipettes and/or pipette tips can be filed in the data storage of the leak testing apparatus and can be chosen by the operator.

A teaching that acquires special importance enables reference values for special, now measured, pipette tips to be selected which then can be used to compare the pressure rise which has been determined by means of the control apparatus with a reference value which is stored in a data storage or reference values which are stored there. Here, it is assumed for simplification that different pipette tips generate an individual negative pressure in the intake process by the vacuum pump of the test apparatus which allow conclusions regarding the pipettes which are to be used there.

In the data storage of the leak testing apparatus, the pressure increase profiles and the equilibrium pressure for different pipette tips and pipettes can be filed as a reference value and can then be recognized and automatically selected in a selection method prior to the pipette with the pipette tip being evacuated by means of the vacuum pump to a measurement pressure below the atmospheric pressure. As a result, a serviceable/unserviceable determination is possible with higher precision.

Advantageously, method steps prior to the evacuation step can proceed repeatedly on the leak testing apparatus with additional volumes of known size being connected parallel to the pipette. With the comparison of the time interval for evacuation of the different connection volume which has been produced in this way, the dead volume can be determined and the pipette can be selected.

For a precise leak test, the measurement pressure is determined prior to the evacuation step depending on the rated volume, connection volume, and additional volume as well as the tip type.

Fundamentally, it is possible to test a wide range of pipettes and pipette tips of different volume by means of the method according to the invention. However, it is recommended that groups be formed, for which details have been given above.

As has already been explained, the subject matter of the invention is also a corresponding leak testing apparatus for leak testing of hand-held, single channel or multichannel piston stroke pipettes, preferably those with an air cushion.

Similar considerations apply to the device as above to the method according to the invention. Accordingly reference should be made to the statements above. Otherwise, the device is explained in detail below with reference a preferred exemplary embodiment of the invention and the accompanying drawings.

Finally the subject matter of the invention is also a system of leak testing apparatus and adapters. This system is also explained in detailed in the course of the explanation of the exemplary embodiment using the drawings.

BRIEF DESCRIPTION OF THE DRAWINGS

The sole FIGURE of the drawings shows an exemplary embodiment of a test apparatus 1 for leak testing of hand-held, single-channel or multichannel piston stroke pipettes, preferably of those with air cushions (as also shown here).

DETAILED DESCRIPTION OF THE INVENTION

By means of the leak testing apparatus 1, a hand-held piston stroke pipette 2 can be externally checked for leaks, a pipette tip 3 which fits a pipette 2 being slipped onto this pipette 2. The measurement is taken with the pipette tip 3 slipped on and acting on the pipette tip 3 from the outside. The leak testing apparatus 1, in the illustrated exemplary embodiment, has a housing 4 which surrounds the system. In the housing 4 is a vacuum pump 5 which is driven by an electric drive motor 6, optionally via a step-down drive, or also manually. The vacuum pump 5, in this exemplary embodiment, is a membrane pump, but fundamentally other pumps, for example, a piston pump or a hose pump, can also be used. In the illustrated exemplary embodiment and according to a preferred version, the membrane pump 5 is additionally connected downstream of a valve 7 on the intake side.

Part of the leak testing apparatus 1 is also a holder 8 for sealed connection of the pipette tip 3. There can also be other holders for simultaneous connection of several pipette tips of a multichannel piston stroke pipette. A line system 9 extends between the holder 8 and the vacuum pump 5 or the valve 7.

Here, there is preferably an electronic control apparatus 10, a nonvolatile data storage 11 which is assigned to the electronic control apparatus 10, and a pressure sensor 12 which is connected by measurement technology to the line system 9, and here, by evaluation technology to the control apparatus 10. The section between the holder 8 and valve 7 or vacuum pump 5 with connections which emerge on branches forms a certain connecting volume of the leak testing apparatus 1.

It is important for the leak testing apparatus 1 in the invention that the pressure sensor 12 be connected to the connection volume in the line system 9 whose pressure conditions are being measured in order in this way to be able to draw conclusions about the pressure conditions in the pipette tip 3 on the pipette 2.

In all test methods which are accompanied with a rapid change of the pressure in a measurement volume the adiabatic heating or cooling of the moving air mass must be considered to a more or less large extent. This can be done by the introduction of a relaxation phase at the start of the measurement process. Likewise a correction is possible which compensates for the thermally induced effects.

But measures in the connection volume which cause more prompt adaptation of the temperature, such as for example, filler masses with a surface/volume ratio of more than 3, better more than 20, are more useful in terms of measurement technology. High grade steel wool has proven especially effective and useful and more or less directly corrects the air temperature. Its ratio is computed from the circular cross section as follows:

$$d\cdot\pi\cdot 1/d^2\cdot\pi/4\cdot 1 \text{ therefore } 4d/d^2$$

The leak testing apparatus 1 in accordance with the invention works such that, in the piston stroke pipette 2, connected according to the sole FIGURE, the pipette 2 is evacuated with the pipette tip 3 to a measurement pressure below atmospheric pressure. Then, the vacuum pump 5 is turned off and decoupled from the line system 9 by means of the valve 7. The connection volume in the line system 9 is sealed in this way within the leak testing apparatus 1. By means of the pressure sensor 12, at this point, the pressure is measured in the connection volume during a certain time interval and/or after a certain time interval.

In the simplest version of a leak testing apparatus 1, which is not shown, control takes place manually and the pressure sensor 12 is directly coupled to a display apparatus 13. The display apparatus 13 can be set such that the signals of the pressure sensor 12 trigger display changes which indicate the useful state of the tested piston stroke pipette directly, for example, with color signal lamps.

In the leak testing apparatus 1 shown in the exemplary embodiment with the electronic control apparatus 10, the test method is controlled with stored values and algorithms are processed with the stored and variable values, instead of a manual adjustment to the pipette 2. The control apparatus 10 determines the result from the measured pressure rises as to whether the measured piston stroke pipette 2 with the pipette tip 3 is tight enough or not. The electronic control apparatus 10 triggers the display apparatus 13 such that the usable state is preferably displayed in several stages. This display can work with color optical elements, but also with symbols or clear text display.

One advantageous automated procedure can also proceed such that the determined pressure rise is compared by means of the control apparatus 10 to a reference value or reference values stored in the data storage 11. Depending on the result of this comparison, triggered by the control apparatus 10, the pipette 2 is then evaluated as sufficiently tight/usable or insufficient tight/unusable.

The illustrated exemplary embodiment of the leak testing apparatus 1 calls for evaluation of the pipette 2 in discrete stages. More precisely, this exemplary embodiment calls for there to be a middle stage for evaluation of the pipette 2 as slightly leaky/still usable in the evaluation in discrete stages. This takes into account the fact that it is possible specifically for a small leak to maintain the pipetting precision within the framework of the error limits without the action of a leak.

Advantageously, the display apparatus 13 is an optical display with different symbols, colors and/or illuminants. The operator is simply notified with this display 13 whether the measured pipette 2 with pipette tip 3 is in the region of for example, "green", "yellow" or "red" and is thus usable, conditionally usable or no longer usable. An LCD display is especially favorable with respect to energy consumption.

Fundamentally, an acoustic display can also be implemented. Advantageously, a combined optical/acoustic display is also advantageous.

Moreover, the leak testing apparatus 1 on the housing 4 has an on/off switch 14, likewise connected to the control apparatus 10, and a start button 15 for starting corresponding process method segments of the leak testing method in accordance with the invention implemented with this device.

On the intake side, a filter 16, inserted into the line system 9, here outside of the housing 4 of the leak testing apparatus 1, is connected upstream of the valve 7. The filter 16 is designed to prevent the entry of impurities into the leak testing apparatus 1. Its arrangement outside the housing 4 is advantageous in order to be able to easily replace the filter 16. Another filter 16' is located upstream of the valve 7' for venting the connection volume.

The illustrated preferred exemplary embodiment of a leak testing apparatus 1 is furthermore characterized in that the measurement pressure is roughly 20 to roughly 300 hPa, preferably roughly 50 to 150 hPa under atmospheric pressure. Accordingly, it applies that the time interval according to which a pressure rise is determined is between roughly 3 s and roughly 60 s, preferably between roughly 5 s and roughly 20 s. Finally it is recommended that a pressure rise of roughly 0.1 hPa to roughly 50 hPa is a reliable pressure rise.

The pressure sensor 12 can have a resolution from roughly 0.01 hPa to roughly 0.1 hPa in the preferred exemplary embodiment which is to be understood as not limiting and which was explained above in detail. It is a precisely operating pressure sensor 12 which is more favorable in terms of costs and which is advantageously tuned to the pressure regions and pressure rises which are present here.

It was already mentioned above that what is important is the size of the connection volume of the leak testing apparatus 1 for the precision of determining the allowable pressure rise. The illustrated and preferred exemplary embodiment is now characterized in that the leak testing apparatus 1 for pipettes and pipette tips currently in use between 10 µl and 10 ml has a connection volume between roughly 1.0 ml and roughly 200 ml. For a wider range of application of pipette tips 3 and piston stroke pipettes 2, possibly several switchable measurement ranges will have to be provided.

Furthermore, at least one vessel 17 can be connected via a valve 18 to the connection volume. The vessel encloses a certain additional volume so that the connection volume can be increased altogether from roughly 1 ml to roughly 200 ml. To do this, other vessels 17', 17" of different volume can be connected via their respective valves 18', 18". It is also possible to connect several additional volumes and/or those of different size in order to match the connection volume to the dead volume of the pipette/pipette tip system which is to be tested.

An additional volume or vessel 17, 17', 17" of the leak testing apparatus, once evacuated, is or are in operation no longer vented. This shortens not only the time for re-evacuation, but is also used to compensate for the effect which is adiabatic during these pressure changes.

Instead of changing the connection volume with vessels of varied volume, it is also possible to connect a displacer apparatus. It can be permanently connected to the line system 9. The displacer apparatus, for example, of a piston/cylinder unit which is actuated by means of an actuator or manually on the servo drive for the piston, can change its volume.

The illustrated and preferred exemplary embodiment with respect to the leak testing apparatus 1 shows a particularity in that the holder 8 is made in an interchangeable adapter 19. The adapter 19 can be coupled without confusion to the housing 4 of the leak testing apparatus 1 by means of an adapter coupling 20. Thus different adapters 19 can be used for different pipettes 2 with pipette tips 3. Here it is interesting that according to one preferred teaching it can be provided that adapters 19 with different holders 8 for different pipette tips 3 have essentially the same connection volumes.

Of course, it will not be possible to avoid that for an adapter 19 for a multichannel piston stroke pipette, especially an air cushion piston stroke pipette 2, the connection volume of the line system 9 is greater than for a single-channel version. This must be considered accordingly in the execution. A multichannel evaluation can possibly also be undertaken so that, per holder 8 in the multichannel adapter 19, there is its own line system 9 with its own pressure sensor 12.

The illustrated and preferred exemplary embodiment, otherwise, shows that different adapters 19 are coded differently. The adapter 19 for this purpose has coding 21 which can be read mechanically, optically and/or in some way without contact, for example, it is magnetic. A corresponding sensor 22 for the coding 21 of the adapter 19 is located on the housing 4 of the leak testing apparatus 1 and is connected to the control apparatus 10 for evaluation purposes.

According to the preferred method, prior to the actual process of leak testing of the piston stroke pipette 2, an adjustment to the pipette and/or the pipette tip is performed, the values being automatically selected from the data storage. The pipette type, therefore which volume size, single channel or multichannel, etc. can already be in the data storage so that only one choice need be made.

The adjustment to the pipette and/or pipette tip can also be performed by means of data transmission. To do this, the test apparatus has a reader (which however FIG. 1 does not show) in order to pick up the coding which is located on the pipette 2 or on the pipette tip 3, directly or without contact. For example, the pipette tip can bear a bar code and the pipette an RFID chip, transponder or general wireless interface, as is provided in German Patent Application DE-A 199 11 397 for unidirectional or bidirectional data transmission. With the control apparatus, the coding is compared to codings which are stored in the data storage, the corresponding adjustment is determined and accepted for further use. The coding or the transmitted data packets can also contain, for example, the type, size, composition, serial number, chronology of the tests and calibration of the test pieces depending on the capacity.

With the leak testing apparatus 1 in accordance with the invention, to increase the measurement precision, it is possible to proceed such that the leak testing apparatus 1 can be operated such that a pipette tip 3 of interest which fits the piston stroke pipette to be tested as such can be connected to the holder 8, that the connection volume of the test apparatus 1 with the pipette tip 3 connected without the piston stroke pipette 2 with the vacuum pump running 5 is evacuated to an equilibrium pressure which is being established below the atmospheric pressure and that from the equilibrium pressure which is being established by means of the electronic control apparatus 10, the tip type of the pipette tip 3, and moreover, a certain allowable pressure rise for the matching piston stroke pipette 2 can be determined and can be stored as a reference value in the control apparatus 10 or can be used for selection of a correspondingly stored reference value. In particular, a detailed explanation is made in the general part of the specification with respect to the corresponding method claim. It is important that, thus, an indicator for the type of pipette tip 3 and a conclusion regarding the connected piston stroke pipette 2 are possible.

The preferred method with prior calibration of the leak testing apparatus 1 to a certain pipette tip 3 considers that pipette tips 3 have different tip openings. By their more or less large flow resistance to the liquid which is flowing in during pipetting a different negative pressure is established in the tip, therefore in the dead volume. The pipette tip 3 is inserted alone into the adapter 19. This test process is started with the start button 15. With the switch 14 only a single connection can take place. The control apparatus 10 can conclude from the signal of the pressure sensor 12 that only the pipette tip 3 is being tested. The constantly running vacuum pump 5 with the pipette tip 3 open generates a certain negative pressure in the connection volume, therefore in the line system 9, which is measured by the pressure sensor 12. This negative pressure should be the minimum measurement pressure. From this measurement pressure the control apparatus 10 determines the setpoints for the allowable pressure rise or chooses them accordingly from electronically filed data.

Furthermore, with the leak testing apparatus 1, the dead volume of the piston stroke pipette 2 can be determined. To do this, the pipette 2 is evacuated to a certain negative pressure. After venting the connection and dead volume via the valve 7', the connection volume is increased by an additional volume. A valve 18 to a vessel 17 is opened and the system is evacuated again to the negative pressure. By comparing the pump-out times and the known connection and additional volume, the dead volume of the pipette 2 can be computed. The dead volume influences the measurement pressure which fluctuates in dynamic testing of the pipette, and determines the necessary volume of the line system which must optionally be increased by the additional volume.

The subject matter of the invention is finally also a system for leak testing of piston stroke pipettes with a leak testing apparatus 1 and adapters for different pipette tips 3. Its particulars follow from the aforementioned accordingly.

What is claimed is:

1. A method for testing for leaks in a hand-held, single-channel or multichannel piston stroke pipette, said method comprising the steps of:
   a) fitting a pipette tip onto a pipette;
   b) connecting a free end of the pipette tip on the pipette to a leak testing apparatus, said leak testing apparatus being located externally of the pipette and the leak testing apparatus including a vacuum pump, a pressure sensor, a display apparatus, and a connection volume;
   c) evacuating by the vacuum pump the pipette, the pipette tip, and the connection volume in the leak testing apparatus to a measurement pressure below atmospheric pressure;
   d) stopping or disconnecting the vacuum pump, and sealing the connection volume, and with the connection volume sealed, using the pressure sensor to measure the pressure in the connection volume at least one of during and after a defined time interval with any pressure rise that has occurred being determined; and
   e) depending on said determined pressure rise, evaluating the pipette as to whether the pipette is sufficiently tight/usable or insufficiently tight/unusable.

2. The method as claimed in claim 1, wherein the step of determining the pressure rise which has occurred includes using an electronic control apparatus of the leak testing apparatus to compare the pressure rise determined with at least one reference value stored in a data storage of the control apparatus, and depending on the result of the comparison, indicating by the display apparatus whether the pipette is sufficiently tight/usable or insufficiently tight/unusable.

3. The method as claimed in claim 1, wherein a pressure rise of about 0.1 hPa to about 50 hPa, depending on the pipette, is evaluated as sufficiently tight/usable.

4. The method as claimed in claim 1, wherein the evaluation is indicated by the display apparatus using at least one of digitally, optically, via different symbols, colors, illuminants, and acoustically.

5. The method as claimed in claim 1, wherein the evacuation of the pipette, pipette tip, and connection volume is reduced to a measurement pressure that is from about 20 hPa to about 300 hPa below atmospheric pressure.

6. The method as claimed in claim 1, wherein the defined time interval is between 3 s and about 60 s.

7. The method as claimed in claim 1, wherein for pipettes and pipette tips with a rated volume between 10 µl and 10 ml, a leak testing apparatus is used having at least one additional volume of between about 1.0 ml and about 200 ml that is connectable by a valve to the connection volume of the leak testing apparatus.

8. The method as claimed in claim 1, wherein an adapter from among a plurality of adapters is used for connecting the pipette tip to the leak testing apparatus, the adaptor configured to be matched to the pipette tip being tested.

9. The method as claimed in claim 8, wherein for a multi-channel piston stroke pipette, an adapter with a corresponding number or fraction of the number of holders as pipette tips for the channels is used, the adapter having individual connection volumes each of which is connected to a respective pipette tip.

10. The method as claimed in claim 8, wherein different adapters are coded differently and wherein the coding of the adapter is automatically detected by the leak testing apparatus.

11. The method as claimed in claim 10, further comprising, prior to fitting of the pipette tip onto the pipette, a preliminary step of adjusting the leak testing apparatus to at least one of the pipette and pipette tip based on reading of the coding with the control apparatus and comparing the coding to codings stored in a data storage relating to known pipettes.

12. The method as claimed in claim 8, wherein an adapter is used for connecting the pipette tip to the leak testing apparatus, the adapter being matched to the particular pipette tip used.

13. The method as claimed in claim 12, wherein different adapters for different pipette tips all have the same connection volume.

14. The method as claimed in claim 1, further comprising the following preliminary steps prior to fitting of the pipette tip onto the pipette of:
   connecting the pipette tip for the pipette to be tested to the leak testing apparatus,
   without the pipette connected to the pipette tip, by the leak testing apparatus, evacuating the connection volume with the vacuum pump running to establish an equilibrium pressure below the atmospheric pressure, and
   from the equilibrium pressure established, by the electronic control apparatus, determining the tip type and measurement pressure and either storing the determined type and pressure as reference values or using the measurement pressure for selection of a stored reference value.

15. The method as claimed in claim 14, wherein prior to the step of evacuating the pipette, pipette tip and a connection volume, recognizing at least one of the type of pipette and type of pipette tips by the leak testing apparatus and automatically selecting values from the stored reference values based on the at least one of the type of pipette and type of pipette tips recognized, and wherein the time interval for the evacuation of the connection volume and the dead volume of the pipette is selected based on the selected values.

16. The method as claimed in claim 1, wherein the measurement pressure to which the pipette with the pipette tip and the connection volume is evacuated is chosen such that motion of a piston of the pipette in an intake direction is still possible.

17. The method as claimed in claim 1, wherein, prior to leak testing of at least one of a specific pipette and pipette tip, adjusting of the leak testing apparatus to the at least one of the specific pipette and pipette tip to be leak tested is performed.

18. The method as claimed in claim 17, wherein said adjusting of the leak testing apparatus is performed using values of various known pipettes from a data storage of the leak testing apparatus.

19. A leak testing apparatus for leak testing of a hand-held, single-channel or multichannel piston stroke pipette, said leak testing apparatus comprising:
- a motor-driven vacuum pump;
- at least one holder for sealed connection to a free end of at least one pipette tip slipped onto a pipette;
- a line system extending between the at least one holder and the vacuum pump, the line system with connecting sections of the leak testing apparatus forming a defined connection volume;
- an electronic control apparatus;
- a data storage assigned to the electronic control apparatus;
- a pressure sensor connected to the line system and to the electronic control apparatus; and
- a display apparatus, wherein
- the leak testing apparatus being located externally of the pipette and the electronic control apparatus being configured to evacuate the pipette, the pipette tip, and the connection volume by the vacuum pump, stopping or disconnecting the vacuum pump, and sealing the connection volume, and with the connection volume sealed, the pressure sensor measuring the pressure in the connection volume at at least one of during and after a defined time interval with any pressure rise that occurs being determined, and depending upon the determined pressure rise, the pipette being evaluated as to whether the pipette is sufficiently tight/usable or insufficiently tight/unusable.

20. The apparatus as claimed in claim 19, wherein a valve is connected upstream of the intake side of the vacuum pump.

21. The apparatus as claimed in claim 19, wherein the control apparatus is adapted to compare the determined pressure rise with at least one reference value stored in the data storage and depending on the result of the comparison, evaluate the pipette as sufficiently tight/usable or insufficiently tight/unusable.

22. The apparatus as claimed in claim 19, wherein the displaying of the evaluation of the tightness of the pipette by the display apparatus is provided by at least one of digitally, optically, symbols, colors, illuminants, and acoustically.

23. The apparatus as claimed in claim 19, further comprising, for pipettes and pipette tips with a rated volume between 10 μl and 10 ml, at least one additional volume of between about 1.0 ml and about 200 ml in addition to the connection volume which is connectable by a valve.

24. The apparatus as claimed in claim 19, wherein the holder is provided in a selected one of a plurality of different interchangeable adapters the adapters having different holders for different pipette tips, the selected adapter being attached as part of the line system.

25. The apparatus according to claim 24, wherein each of said plurality of adapters is matched to the particular pipette tip.

26. The apparatus according to claim 25, wherein the connection volume is the same irrespective of the particular adapter and pipette tip used.

27. The apparatus according to claim 19, further comprising means for adjusting of the leak testing apparatus using values of various known pipettes from said data storage.

* * * * *